(12) United States Patent
Parolari

(10) Patent No.: US 9,078,168 B2
(45) Date of Patent: Jul. 7, 2015

(54) METHOD FOR THE EARLY ESTABLISHMENT OF UPLINK TBFS

(71) Applicant: Cellular Communications Equipment LLC, Plano, TX (US)

(72) Inventor: Sergio Parolari, Milan (IT)

(73) Assignee: Cellular Communications Equipment LLC, Plano, TX (US)

( * ) Notice: Subject to any disclaimer, the term of this patent is extended or adjusted under 35 U.S.C. 154(b) by 0 days.

(21) Appl. No.: 14/457,030

(22) Filed: Aug. 11, 2014

(65) Prior Publication Data

US 2014/0369299 A1 Dec. 18, 2014

Related U.S. Application Data

(63) Continuation of application No. 12/084,489, filed as application No. PCT/EP2006/010411 on Oct. 30, 2006, now Pat. No. 8,804,629.

(30) Foreign Application Priority Data

Nov. 2, 2005 (EP) .................................... 05425768

(51) Int. Cl.
   *H04W 4/00* (2009.01)
   *H04W 28/14* (2009.01)
   *H04W 72/12* (2009.01)
   *H04W 92/12* (2009.01)

(52) U.S. Cl.
   CPC .......... *H04W 28/14* (2013.01); *H04W 72/1268* (2013.01); *H04W 72/1289* (2013.01); *H04W 92/12* (2013.01)

(58) Field of Classification Search
   CPC .................................................... H04W 28/14
   USPC ......................................................... 370/329
   See application file for complete search history.

(56) References Cited

U.S. PATENT DOCUMENTS 7,564,784 B2   7/2009  Forssell et al.
2009/0219864 A1  9/2009  Parolari

FOREIGN PATENT DOCUMENTS

| EP | 1 257 096 | 11/2002 |
|----|-----------|---------|
| RU | 2242092 | 12/2004 |
| WO | WO 01/58095 | 8/2001 |
| WO | WO 02/13559 | 2/2002 |
| WO | WO 02/32168 | 4/2002 |
| WO | WO 02/51177 | 6/2002 |
| WO | WO 2005/041599 | 5/2005 |

OTHER PUBLICATIONS

3GPP, 3rd Generation Partnership Project; Technical Specification Group GSM/EDGE Radio Access Network; General Packet Radio Service (CPRS); Mobile Station (MS)-Base Station System (BSS) interface; Radio Link Control/Medium Access Control (RLC/MAC) protocol (Release 6), 3GPP TS 44.060 V6.2.0 (Apr. 2003), 339 pgs.
Ericsson, "Early Allocation of TBFs," 3GPP TSG GERAN#26BIS, G2-050396, available at: http://www.3gpp.org/ftp/tsg_geran/Wg2_Protocol_Aspects/GERAN2_26bis_Sophia-Antipolis/Docs/, Oct. 3, 2005, 2 pgs.
Russian Office Action for related Russian Application No. 2008121883/09(026013), issued Nov. 9, 2010, 7 pgs.
Siemens, "Early TBF establishment," 3GPP TSG-GERAN #27, GP-052632, available at: http://www.3gpp.org/ftp/tsg_geran/tsg_geran/geran_27_atlanta/docs/, Nov. 7, 2005, 3 pgs.

*Primary Examiner* — Shripal Khajuria
(74) *Attorney, Agent, or Firm* — Martin & Ferraro, LLP

(57) ABSTRACT

A mobile station operating in EGPRS mode needs to the early establishment of an uplink TBF although has not data to send, at the only precautionary purpose of preventing an intolerable latency negatively affecting the subsequent delay-sensitive transmissions. To this aim, the mobile sends a Packet Channel Request message in one phase access mode including a new establishment cause called "Early TBF establishment." The network establishes an uplink TBF indicating the requester and assigns a radio resource on one PDCH channel or more. Then the network schedules the transmission from the mobile station also when it does not have data to transmit other than dummy packets. This is performed through the USF flags in the usual manner. As soon as actual data become available for transmission, the mobile send them instead of dummy packets. In an alternative embodiment the mobile sends the Packet Channel Request message in two phase access mode. As soon as the Packet Uplink Assignment message is received by the mobile station, it sends a Packet resource Request message including an extended Uplink TBF information. The network behaves as in the previous case.

21 Claims, 4 Drawing Sheets

METHOD FOR THE EARLY ESTABLISHMENT OF UPLINK TBFS

CROSS REFERENCE TO RELATED APPLICATIONS

This application is a Continuation of U.S. patent application Ser. No. 12/084,489 filed on Nov. 3, 2008; which is a U.S. National Stage Entry under 35 U.S.C. §371 and claims priority to Application No. PCT/EP2006/010411 filed on Oct. 30, 2006; which is based on and claims priority to European Application No. EP05425768.8 filed on Nov. 2, 2005; the contents of which are hereby incorporated by reference.

BACKGROUND

The present invention relates to the field of mobile radio systems from 2.5 generation, and more precisely to a method for the early establishment of uplink TBFs. To simplify the disclosure, used acronyms are given at the end of the description. For the sake of simplicity only the (E)GPRS embodiment will be described, but the same conclusions are valid for the other 3GPP systems (UMTS).

FIG. 1 shows the functional architecture of a GSM/EDGE network according to TS 44.060 V.6.2.0, including the following functional blocks: SGSN, GGSN, EIR, BSS, MSC/VLR, HLR, SMS-GMSC, SMS-IWMSC, SM-SC and MS. The latter includes a first functional block TE connected to a second functional block MT through a connection indicated by a Reference point R, typically supporting a standard serial interface. The MT block is connected to the Um interface supplying packet data services on radio channels. The following interfaces are foreseen: Um, Gi, Gp, Gb, Gn, Gp, Gf, Gs, Gr, Gd, D, E, C, whose connectivity between the relevant blocks are directly visible in the figure. In particular, the Gn interface connects two GSN nodes in the same PLMN system, while the Gp interface connects two GSN nodes belonging to different PLMN systems. The BSS block includes a plurality of BTS connected to a through a respective Abis interface (FIG. 2).

In operation, at the Um and Abis interfaces several protocols are stacked upon the physical layer, in particular MAC, RLC, and LLC. RLC gives a reliable radio link and maps the LLC frames within the physical GSM channel. Signalling procedures for accessing the radio channel are controlled by MAC, which also governs dynamic allocation of the resources (request and grant). Dynamic allocation means that a particular transmission resource, including for instance of a PDCH channel on a physical timeslot, is made time division shareable among more MS mobiles, each of them being engaged in an active session of data transfer, or signalling, through the same transmission resource jointly assigned.

The sub-set of MAC procedures governing the dynamic allocation of resources, provides temporary connections on the physical layer, called TBFs, which include memory buffers to house the queues of RLC/MAC blocks. Each TBF connection enables the unidirectional transfer of data and user signaling within a cell between the network and a mobile station MS, or vice versa. Control messages for the establishment/abatement of a connection and the allocation/de-allocation of relevant supported physical resources, for instance of TBF buffers, contemplate different opportunities capable of covering the whole survey foreseen in the packet transfer mode of the RR sublayer. For simplicity, it is here described a very limited survey of establishment/abatement of TBF connections and of the relevant operation modes. We can start from the establishment of a TBF uplink connection following a Packet Transfer originated by the mobile. In this case the mobile requires the assignment of a GPRS channel sending a PACKET CHANNEL REQUEST message including the resources requested for the transfer of packets to the network. In case of reception, the network replies with a PACKET UPLINK ASSIGNMENT message on the control channel allocating to the mobile the resources requested for the uplink transfer of packets. The resources include one or more PDCH channels and a TFI value. The network does not assign any buffer in uplink direction (the buffer resides in the mobile). The network requires simply knowing the number of blocks that a MS mobile intends to transmit. We can now proceed examining the establishment of a TBF connection downlink following a Packet Transfer ended towards the mobile. In this case at the end of the paging procedure, the network sends the mobile a PACKET DOWNLINK ASSIGNMENT message in the Ready state on the control channel, with enclosed the list of PDCH channels allocated for the downlink transfer. A buffer, relevant to the downlink TBF, is purposely allocated to contain the RLC/MAC blocks to be sent.

In the majority of the cases a TBF is kept alive only for the transfer of one or more LLC protocol units, to the right purpose of transferring the corresponding RLC/MAC blocks. The network assigns each TBF connection its own temporary identifier, called TFI (Temporary Flow Identity). The mobile shall assume that the TFI value is unique among TBF competitors in each direction, uplink or downlink. A RLC/MAC data block is identified to the TBF to which it is associated through its own field where the identifier TFI is written, and another field to indicate the uplink or downlink direction of the block. Should the RLC/MAC block be referred to a control message, a field is foreseen to indicate the message transmission direction and type. In the case of dynamic allocation, the header of each RLC/MAC block transmitted on a PDCH channel in "downlink" direction includes an additional field called USF, which is used by the network in the form of a flag to control the time division multiplexing of different mobile stations on a physical channel PDCH in uplink direction. We can now better qualify the already mentioned PACKET UPLINK ASSIGNMENT message, sent by the network towards the mobiles, stating that it includes: the identifier TFI of the downlink/TBF buffer containing the control block carrying this message, the list of the allocated PDCH channels (time slots), and a corresponding USF value for each allocated channel. Three bits are foreseen for the USF field that enable to unambiguously discriminate up to eight users sharing a time-slot, also in the borderline case in which the single TBF buffer are associated all the eight time slots of a TDMA frame.

Outlined Technical Problem

The setup time of a TBF in (E)GPRS system might be in the order of several hundreds of milliseconds. In the case of an uplink TBF this is due to the combined effects of the random access procedure, the bring-up time on the A-bis interface, the round-trip time between the mobile station and the PCU, etc.

For delay sensitive real-time applications a setup time of hundreds of milliseconds would impair the performance greatly. For instance, this is the case for applications, or VoIP over cellular.

In 3GPP, TSG GERAN is currently discussing possible enhancements to reduce latency in the PS domain, including solutions to reduce the initial setup time of a TBF.

One idea, which has already been discussed in standardization, is the possibility to enable an "early TBF establishment", i.e. the possibility for a mobile station to request an uplink TBF even before some actual data is ready for transmission.

If a mobile station is enabled to open an uplink TBF in advance (i.e. before some actual data is available for transmission), this means that no setup time will be needed as soon as there is a real need to transmit something in the uplink.

Some specific proposals on how to realize this behaviour have already been presented for standardization: see for instance GP-052038 and GP-052039 (respectively become G2-050396 and G2-050397) on "Phantom TBFs". But such proposals have some important drawbacks. For instance:
- they foresee the definition a special TBF type, only needed for this procedure, adding extra complexity in both the MS and the network;
- they are linked to the support of multiple TBFs in both the MS and in the network, thus limiting the general applicability of the solution;
- they are linked to the early detection of a SIP signalling indication by the MS.

SUMMARY

In view of the discussion above, it is one possible object to provide an alternative simpler solution that reuses some already available procedures in the standard and does not have the support of multiple TBFs, nor any other capability, as a pre-requisite.

The invention proposes an uplink TBF establishing method that includes the following:
a) transmitting by the mobile station to the network a request for the establishment of an early uplink TBF even if the mobile station has not data to transmit;
b) establishing by the network an early uplink TBF to said mobile station;
c) scheduling by the network permissions, also called USF, to the mobile station to transmit packet data from said early uplink TBF;
d) transmitting dummy packets from said early uplink TBF by said mobile station as the proper USFs are detected and it has not data to transmit;
e) transmitting available actual packet data from said early uplink TBF by said mobile station as the proper USFs are detected.

As alternative to send dummy uplink control blocks, the mobile does not transmit any message if the support of this capability is indicated by the network. Thanks to the proposed method the uplink TBF is kept in a sort of stand-by state, so that when further data needs to be transmitted the MS can immediately resume the transmission with no need to re-open the TBF passing through the random access procedure.

According to a first embodiment, the early uplink TBF establishment information is a relatively new "cause" foreseen in the (EGPRS) Packet Channel Request message for one-phase access procedure, clarifying the request the mobile is performing on the (P)RACH is for an "Early TBF establishment". The specific indication to the BSS that the request being performed by the mobile station is for an "early TBF establishment" could also be used by the network to understand that the initial message transmitted by the mobile station to open the TBF (i.e. the empty LLC frame) doesn't carry any actual information. In this case the BSS could optionally decide to discard it locally (i.e. not forward it to the SGSN) therefore avoiding any impact also on the Gb interface.

According to a second embodiment, and considering that the number of combination of bits still available to signal the early uplink TBF assignment cause in an access burst is very reduced, the early establishment is now a specific request to start an "extended UL TBF" in the second message of a two-phase access procedure, i.e. the Packet Resource Request message. Since this message is conveyed in a proper radio block and not in a short access burst, adding additional information to it wouldn't be problem at all. It should be noted that, even though the two-phase access procedure is intrinsically slower than the one-phase access one, this wouldn't be a problem at all in this case. This procedure would be used well before the actual need to send data, so that no extra delays would be added.

The scheduler design imposes the predetermination of such real cases an early TBF establishment information is requested. This may be done, for example, in delay-sensitive scenarios. After that, the transmission of dummy control blocks instead of true data upon the USF scheduling is currently used in the art.

The proposed solution:
- Does not in introduce any delay at the very instant that incoming data to transmit become available.
- Does not introduce additional procedures in the mobile station and in the network nor new TBFs types.
- Does not require any capability indicator in the MS Radio Access Capability, nor to be linked to any other MS capability (e.g. mTBF or other).
- Does not require the indication of specific network support.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
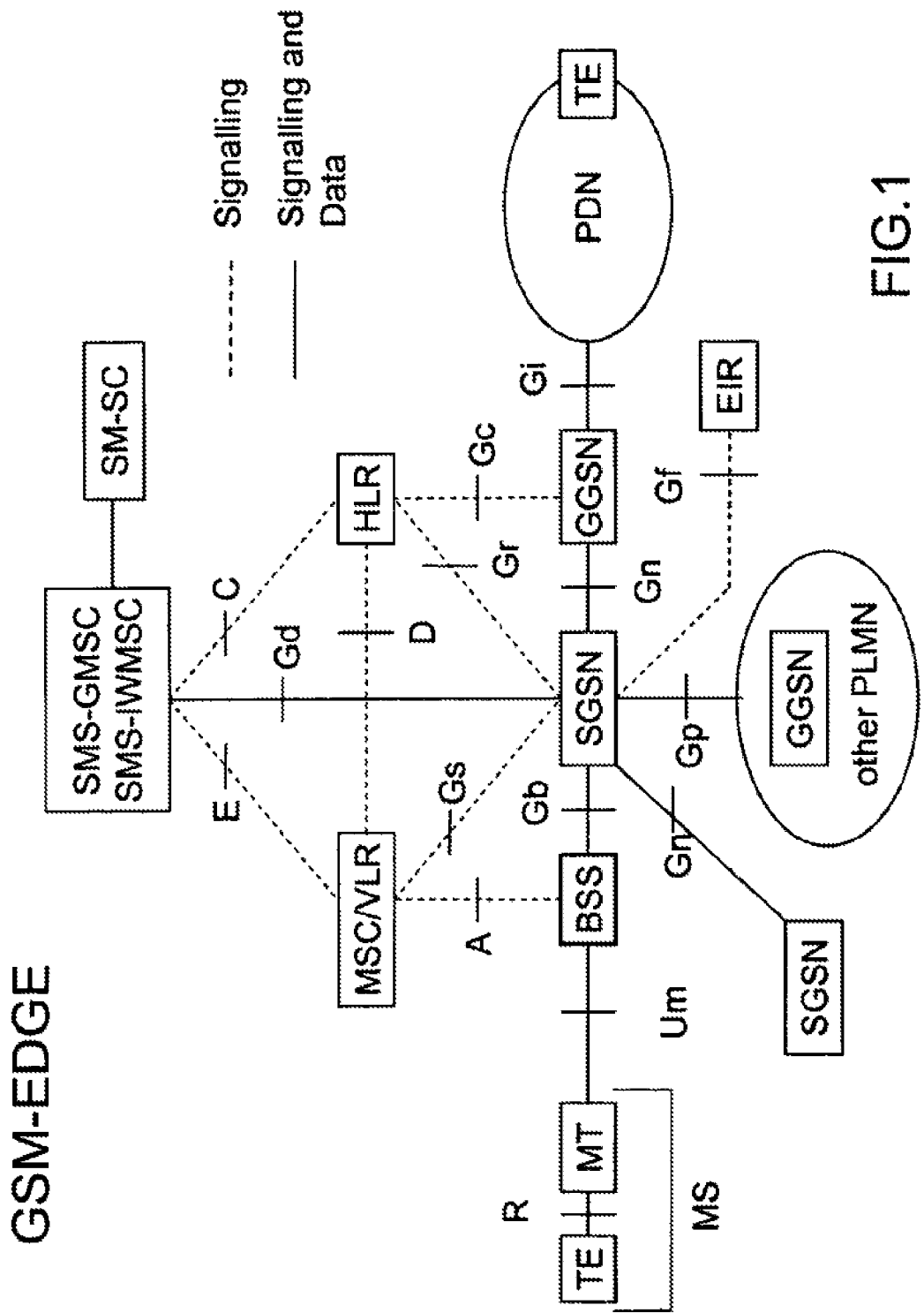
FIG. 1, already described, shows a GSM-EDGE system.

Reference will now be made in detail to the preferred embodiments of the present invention, examples of which are illustrated in the accompanying drawings, wherein like reference numerals refer to like elements throughout.

The GSM/EGPRS TDMA signal is structured as cyclic multiframes of 52 basic frames divided into 12 radio blocks plus two T frames used for the synchronisation and two X idle frames. Each radio block including four basic frames, The multiframe is used to time multiplex the GPRS and GSM logical channels. The LLC layer frames are segmented within the radio blocks of the RLC/MAC layer. Each radio block is transported by four consecutive Normal bursts of the multiframe. The four Normal bursts have to be intended as interleaved on four consecutive TDMA 4.615 ms frames. The resources necessary to the GPRS service foresee an additional number of logical channels supporting the transfer of radio blocks through the physical Packet Data Channel (PDCH). GPRS logical channels have names and functional characteristics greatly faithfully following those of the channels of the traditional GSM, though referred to packets.

Two basic RLC/MAC block structures are used either for data transfer or for control message transfer. TS 44.060, FIG.

10.0a.2.1 shows a structure for EGPRS data transfer including a RLC/MAC header and a RLC data block 1, optionally followed by a RLC data block 2. TS 44.060, FIG. 10.0a.3.1 shows a structure for control message transfer including a MAC header and a RLC/MAC control block. The different components of an RLC/MAC block carrying a GPRS RLC data block or an RLC/MAC control block shall be assembled sequentially. Each component has an integer number of octets. The assembling of components shall be performed progressively, starting in octet number 1 of the physical block.

Figure 2:
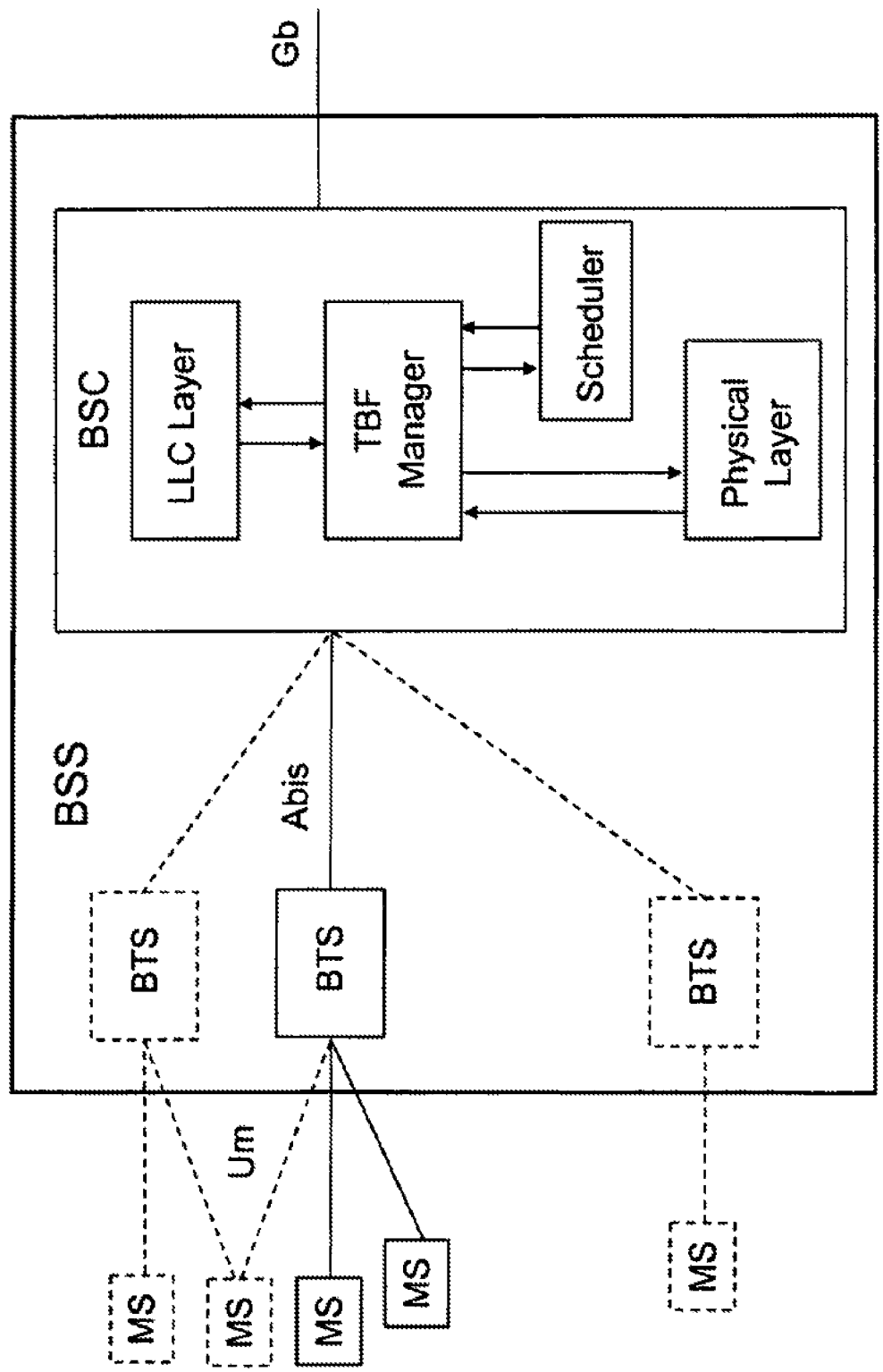
FIG. 2 shows a BSS block of FIG. 1 connected to several MS, constituting the scenario in which the proposed method is implemented.

FIG. 2 shows a BSS block connected to a plurality of MS blocks. The BSS block includes a BSC block and some BTS blocks. The BSC block includes in turn a block called LLC Layer, a Physical Layer block, a TBF MANAGER block, and a Scheduler block. The BSC is connected to the SGSN block of the Figure through a Gb interface. The LLC Layer has a bi-directional connection with the TBF MANAGER that, in turn has a bi-directional connection with the Scheduler block and with the Physical Layer. The BSC is charged with the majority of the operations dealing with TBFs, and the exchange of relevant RR messages on the Abis interface. The LLC Layer sends to the TBF MANAGER the LLC frames for downlink buffered connections, and receives from the TBF MANAGER the LLC frames for the uplink connections. The TBF MANAGER sends to the Physical Layer the RLC/MAC radio blocks with the associated USF multiplexed for TDMA on each time slot. The Physical Layer sends the TBF Manager the RLC/MAC radio blocks coming from the uplink connections. The TBF MANAGER transmits to the Scheduler the indication of number of radio blocks to transmit for each DL_TBF connection and UL TBF connection. The Scheduler, in its turn, includes a Downlink and an Uplink Scheduler providing the TBF MANAGER with scheduling information.

The purpose of the packet access procedure is to establish a TBF to support the transfer of upper-layer PDUs in the direction from the mobile station to the network. Packet access shall be done on PCCCH, as defined in this clause, if a PCCCH exists. Otherwise, packet access shall be done on CCCH, as defined in 3GPP TS 44.018. The packet access can be done in either one phase (clause 7.1.2) or in two phases (clauses 7.1.2 and 7.1.3).

According to TS 44.060, paragraph 7.1.2, the mobile station shall initiate the one phase packet access procedure by scheduling the sending of PACKET CHANNEL REQUEST messages on the PRACH channel corresponding to its PCCCH_GROUP and simultaneously leaving the packet idle mode. The mobile station shall use the last access parameters received on PBCCH. The PACKET CHANNEL REQUEST messages are sent on PRACH and contain an indication (establishment cause) of the type of access and parameters required to indicate the mobile station's demand of radio resource (frequency, timeslot, code, etc.). On receipt of a PACKET CHANNEL REQUEST message, the network may assign a radio resource on one or more PDCHs to be used by the mobile station for the TBF in GPRS TBF mode. On receipt of an EGPRS PACKET CHANNEL REQUEST message, the network may assign a radio resource on one or more PDCHs to be used by the mobile station for the TBF in EGPRS TBF mode or GPRS TBF mode. If the dynamic allocation medium access mode is used, the network shall include the USF values allocated for PDCHs in the PACKET UPLINK ASSIGNMENT message.

Figure 3:
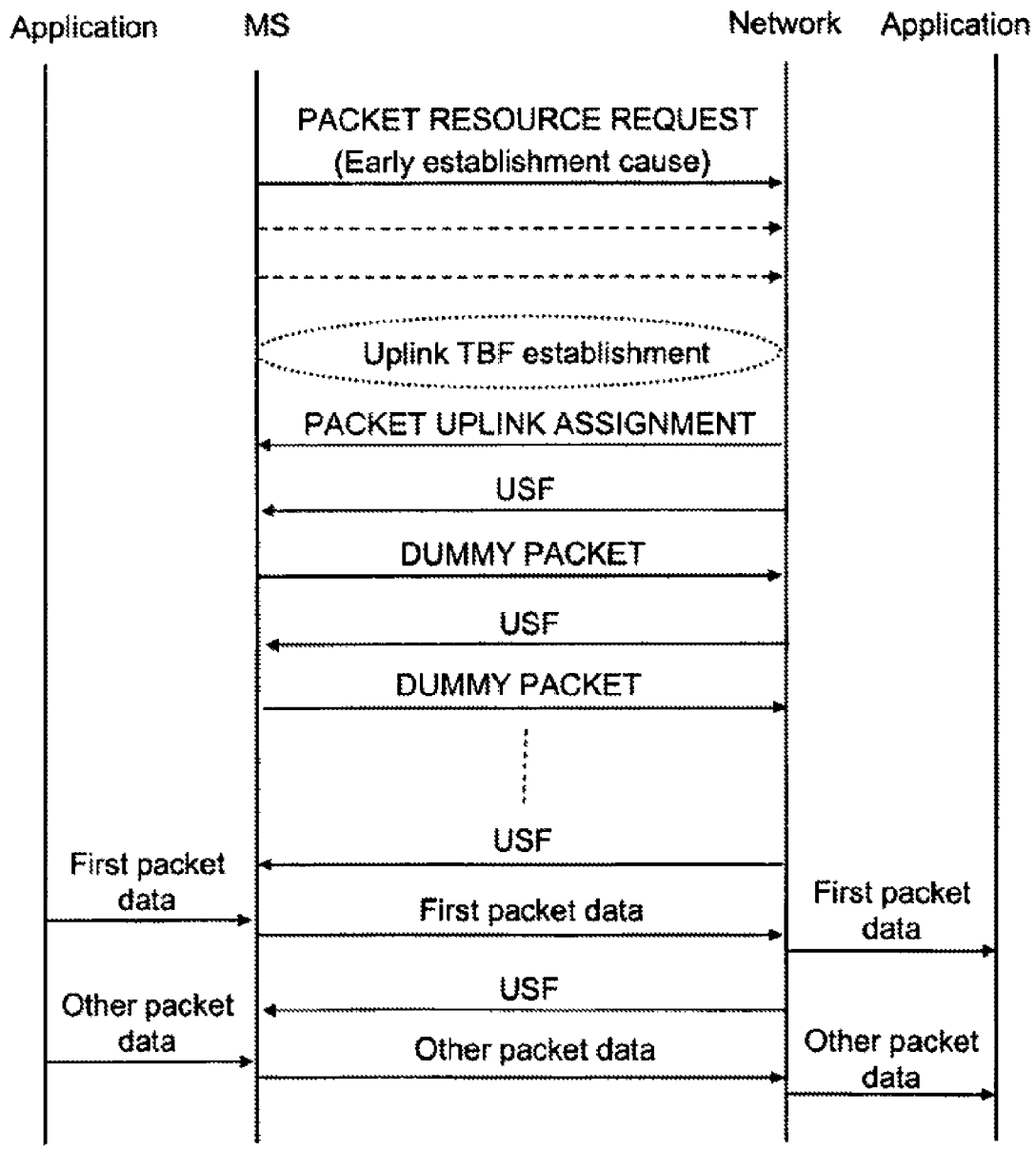
FIGS. 3 and 4 show two message sequence diagrams of two respective embodiments of the early uplink TBF establishment method according to the proposed method.

In FIG. 3, the previous one phase access procedure is modified according to a first embodiment aimed to solve the problem of the early establishment of an uplink TBF. With reference to FIG. 3, the PACKET CHANNEL REQUEST message includes an additional establishment cause called "Early establishment cause" that is linked to those situations the cause is needed, for example the delay-sensitive real-time applications. The network, after having allocated the requested PDCH resources to the mobile station, predisposes it to receive dummy control block from the mobile station. In the alternative, the network predisposes ft not to receive any messages if the support of this capability is indicated by the network. To this aim the network schedules the uplink transmission instants by conveying relevant USF flags in proper downlink messages, i.e. UPLINK ACK/NACK messages. The mobile station handshakes DUMMY control blocks to the USFs until an actual packet data is coming from the application. According to TS 44.060, paragraph 7.1.3, when the TBF is established using two phase access: in the first phase of a two phase access in a cell provided with a PCCCH, the same procedures as for one phase access are used until the network sends a PACKET UPLINK ASSIGNMENT message including a Single Block Allocation structure or Multi Block Allocation structure, denoting two phase access to the mobile station. The Multi Block Allocation structure may be used only if the mobile station has EGPRS capability (i.e. the network received an EGPRS PACKET CHANNEL REQUEST message from the mobile station). In the PACKET UPLINK ASSIGNMENT message, the network reserves a limited resource on one PDCH to the mobile station where the mobile station may transmit a PACKET RESOURCE REQUEST message and optionally an ADDITIONAL MS RADIO ACCESS CAPABILITIES message.

Figure 4:
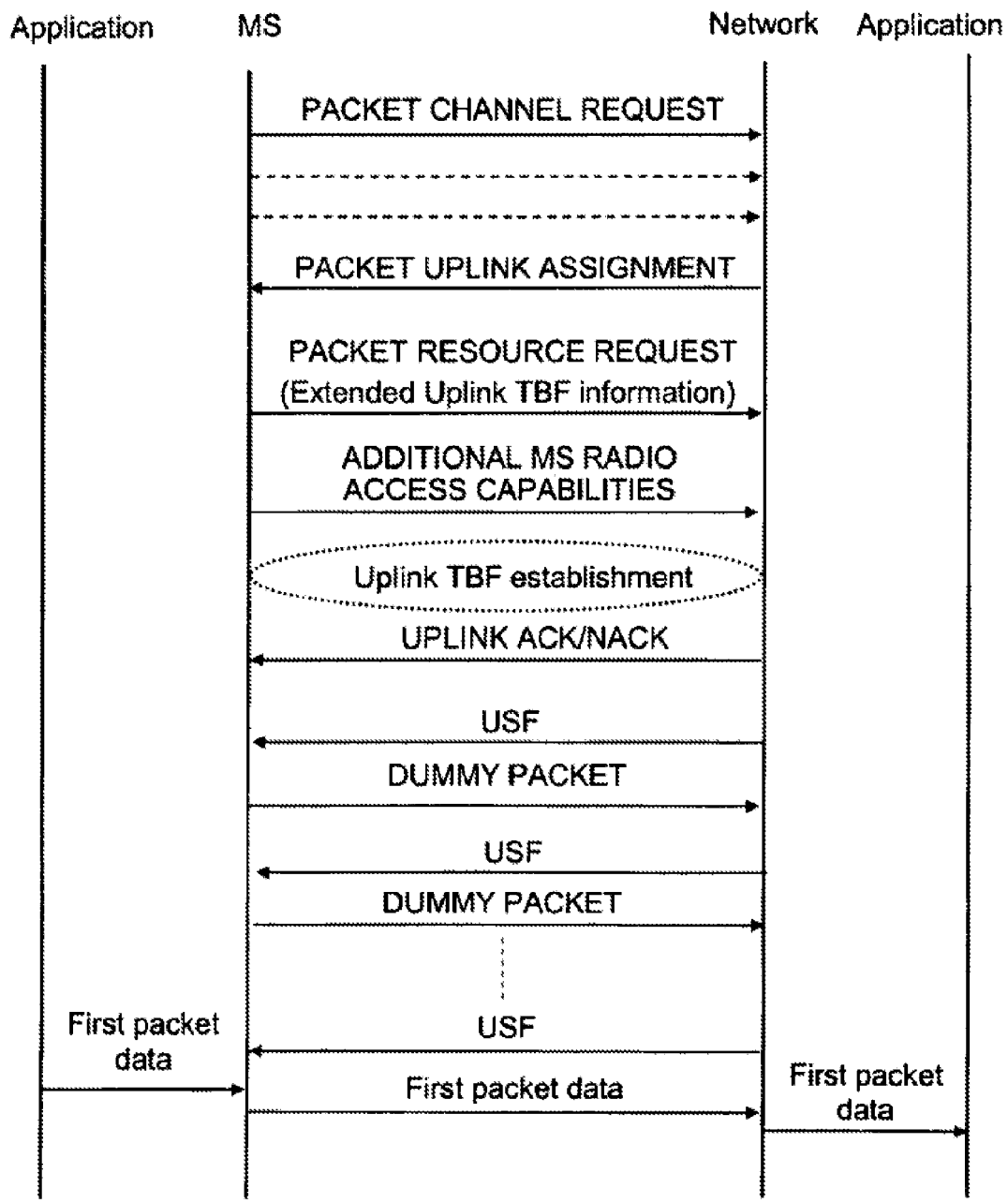

In FIG. 4 the two phase access procedure is modified according to a second embodiment, also aimed to solve the problem of the early establishment of an uplink TBF. With reference to FIG. 4, the mobile sends a PACKET CHANNEL REQUEST message to the network, and receives back a PACKET UPLINK ASSIGNMENT message with the assignment of the requested channel. The mobile replies to the PACKET UPLINK ASSIGNMENT message with a PACKET RESOURCE REQUEST message including an Extended uplink TBF information. The network establishes an Uplink TBF indicating the requesting mobile station and handshakes USF flags as in the previous FIG. 3.

USED ACRONYMS

3GPP—$3^{rd}$ Generation Partnership Program
BSC—Base Station Controller
BSS—Base Station Subsystem
BTS—Base Transceiver Station
CCCH—Common Control Channel
EDGE—Enhanced Data rates for GSM Evolution
EGPRS—Enhanced GPRS
EIR—Equipment Identity Register
GERAN—GSM/EDGE Radio Access Network
GGSN—Gateway GSN
GMSC—Gateway MSC
GP—GERAN Plenary
GPRS—General Packet Radio Service
GSM—Global System for Mobile communications
IWMSC—InterWorking
LLC—Logical Link Control
MAC—Medium Access Protocol
MS—Mobile Station
MSC—Message Switching Centre
MT—Mobile Terminated
PBCCH—Packet Broadcast Control Channel
PCCCH—Packet Common Control Channel
PDCH—Packet Data Channel PDU—Protocol Data Unit
PLMN—Public Land Mobile Network
PoC—Push-to-Talk over Cellular
PRACH—Physical Random Access Channel
CR—Change Request
RLC—Radio Link Control
SC—Service Centre
SGSN—Service GPRS Support Node
SMS—Short Message Service
TBF—Temporary Block Row
TE—Terminal Equipment
TFI—TBF identifier
TSG—Technical Specification Group
UMTS—Universal Mobile Telecommunication System
USF—Uplink State Rag
VLR—Visitor Location Register
VoIP—Voice over IP The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

What is claimed is:

1. A method for establishing a temporary block flow (TBF) that includes a buffer for packet data to be transmitted on a packet data channel from a mobile station to a wireless network, the method comprising:
    transmitting, by the mobile station, a request for establishment of an early uplink TBF to the wireless network, the request for the establishment of the early uplink TBF being transmitted before there is a need to transmit actual packet data for delay sensitive transmissions;
    transmitting, by the mobile station, a packet channel request message to the wireless network;
    transmitting, by the mobile station, dummy packets from the early uplink TBF when the mobile station receives a notification that the early uplink TBF has been established, but the mobile station has no actual packet data to transmit; and
    transmitting, by the mobile station, the actual packet data from the early uplink TBF when the mobile station receives the notification that the early uplink TBF has been established and the mobile station has the actual packet data available to transmit.

2. The method of claim 1, wherein, after the early uplink TBF has been established, the wireless network is prepared to receive the dummy packets from the mobile station.

3. The method of claim 2, wherein the dummy packets are discarded locally by the wireless network.

4. The method of claim 1, wherein the request for the establishment of the early uplink TBF is included in the packet channel request message in a one phase packet access procedure.

5. The method of claim 1, wherein the transmitting of the packet channel request message occurs before the request for the establishment of the early uplink TBF is transmitted.

6. The method of claim 1, wherein, before the request for the establishment of the early uplink TBF is transmitted, a two phase packet access procedure is performed, the two phase packet access procedure comprising:
    the transmitting, by the mobile station, of the packet channel request message to the wireless network; and
    transmitting, by the wireless network, a packet uplink assignment message to the mobile station.

7. The method of claim 6, wherein, with the packet uplink assignment message, the wireless network reserves a resource where the mobile station transmits an uplink packet resource request message.

8. The method of claim 7, wherein the request for the establishment of the early uplink TBF is included in the uplink packet resource request message.

9. The method of claim 1, wherein the wireless network is a 3GPP wireless network.

10. A mobile station comprising:
    a transmitter configured to:
        transmit a request for establishment of an early uplink temporary block flow (TBF) to a wireless network, the request for the establishment of the early uplink TBF being transmitted before there is a need to transmit actual packet data for delay sensitive transmissions;
        transmit a packet channel request message to the wireless network;
        transmit dummy packets from the early uplink TBF when the mobile station receives a notification that the early TBF has been established, but the mobile station has no actual packet data to transmit; and
        transmit the actual packet data from the early uplink TBF when the mobile station receives the notification that the early uplink TBF has been established and the mobile station has the actual packet data available to transmit; and
    a detection unit configured to detect the permissions to transmit the actual packet data from the early uplink TBF.

11. The mobile station of claim 10, wherein, after the early uplink TBF has been established, the wireless network is configured to receive the dummy packets from the mobile station.

12. The mobile station of claim 11, wherein the dummy packets are discarded locally by the wireless network.

13. The mobile station of claim 10, further comprising a receiver configured to receive a packet uplink assignment message from the wireless network.

14. The mobile station of claim 13, wherein, with the packet uplink assignment message, the wireless network reserves a resource where the mobile station transmits an uplink packet resource request message.

15. The mobile station of claim 14, wherein the request for the establishment of the early uplink TBF is included in the uplink packet resource request message.

16. A wireless network comprising:
    a base station;
    a base station controller; and
    a mobile station, the mobile station comprising:
        a transmitter configured to:
            transmit a request for establishment of an early uplink temporary block flow (TBF) to the wireless network, the request for the establishment of the early uplink TBF being transmitted before there is a need to transmit actual packet data for delay sensitive transmissions;
            transmit a packet channel request message to the wireless network;
            transmit dummy packets from the early uplink TBF when the mobile station receives a notification that the early uplink TBF has been established, but the mobile station has no actual packet data to transmit; and
            transmit the actual packet data from the early uplink TBF when the mobile station receives the notification that the early uplink TBF has been established and the mobile station has the actual packet data available to transmit; and a detection unit configured to detect the permissions to transmit the actual packet data from the early uplink TBF.

17. The wireless network of claim 16, wherein, after the early uplink TBF has been established, the wireless network is configured to receive the dummy packets from the mobile station.

18. The wireless network of claim 17, wherein the dummy packets are discarded locally by the wireless network.

19. The wireless network of claim 16, wherein the mobile station further comprises a receiver configured to receive a packet uplink assignment message from the wireless network.

20. The wireless network of claim 19, wherein, with the packet uplink assignment message, the wireless network reserves a resource where the mobile station transmits an uplink packet resource request message.

21. The wireless network of claim 20, wherein the request for the establishment of the early uplink TBF is included in the uplink packet resource request message.

* * * * *